(12) United States Patent
Sekitani et al.

(10) Patent No.: US 10,302,506 B2
(45) Date of Patent: May 28, 2019

(54) RESIN COMPOSITION FOR TEMPERATURE SENSOR, ELEMENT FOR TEMPERATURE SENSOR, TEMPERATURE SENSOR, AND METHOD FOR PRODUCING ELEMENT FOR TEMPERATURE SENSOR

(71) Applicant: JAPAN SCIENCE AND TECHNOLOGY AGENCY, Hon-cho, Kawaguchi-shi, Saitama (JP)

(72) Inventors: Tsuyoshi Sekitani, Osaka (JP); Yuki Terakawa, Tokyo (JP); Tomoyuki Yokota, Tokyo (JP); Takao Someya, Tokyo (JP); Jonathan T. Reeder, Richardson, TX (US)

(73) Assignee: JAPAN SCIENCE AND TECHNOLOGY AGENCY, Kawaguchi-Shi (JP)

( * ) Notice: Subject to any disclaimer, the term of this patent is extended or adjusted under 35 U.S.C. 154(b) by 202 days.

(21) Appl. No.: 15/115,944

(22) PCT Filed: Feb. 5, 2015

(86) PCT No.: PCT/JP2015/053272
§ 371 (c)(1),
(2) Date: Aug. 2, 2016

(87) PCT Pub. No.: WO2015/119205
PCT Pub. Date: Aug. 13, 2015

(65) Prior Publication Data
US 2017/0176262 A1 Jun. 22, 2017

(30) Foreign Application Priority Data
Feb. 6, 2014 (JP) .................. 2014-021767

(51) Int. Cl.
*G01K 7/22* (2006.01)
*C08F 220/18* (2006.01)
(Continued)

(52) U.S. Cl.
CPC .............. *G01K 7/22* (2013.01); *C08F 220/18* (2013.01); *C08K 3/04* (2013.01); *C08L 33/08* (2013.01);
(Continued)

(58) Field of Classification Search
CPC ... G01K 7/22; C09D 7/61; C09D 5/24; C09D 133/08; C08F 220/18; C08F 2220/1891;
(Continued)

(56) References Cited

U.S. PATENT DOCUMENTS 5,085,364 A * 2/1992 Ishikawa ................ C09J 133/06
228/139
5,801,612 A * 9/1998 Chandler ............... H01C 7/027
338/22 R
(Continued)

FOREIGN PATENT DOCUMENTS

CN 1256499 A 6/2000
CN 1363629 A 8/2002
(Continued)

OTHER PUBLICATIONS

International Search Report received for PCT Patent Application No. PCT/JP2015/053272 dated May 12, 2015, 4 pages (2 pages of English translation of International Search Report, 2 pages of International Search Report).
(Continued)

*Primary Examiner* — Jonathan M Dunlap
*Assistant Examiner* — Philip L Cotey

(57) ABSTRACT

In order to provide a resin composition for temperature sensors that includes a polymer and exhibits high flexibility,
(Continued)

higher sensitivity and high cyclic repeatability, a temperature sensor element, a temperature sensor, and a method for producing a temperature sensor, the resin composition (10) for temperature sensors is configured to have conductive particles (2) dispersed in an acrylic polymer (1) obtained by copolymerizing a first acrylic monomer represented by a general formula $CH_2CHCOOX_1$ and a second acrylic monomer represented by a general formula $CH_2CHCOOX_2$.

10 Claims, 12 Drawing Sheets

(51) Int. Cl.
 *C08K 3/04* (2006.01)
 *C08L 33/08* (2006.01)
 *H01C 7/02* (2006.01)
 *H01C 17/065* (2006.01)
 *C09D 7/61* (2018.01)
 *C09D 5/24* (2006.01)
 *C09D 133/08* (2006.01)
 *H01C 17/06* (2006.01)

(52) U.S. Cl.
 CPC .............. *C09D 5/24* (2013.01); *C09D 7/61* (2018.01); *C09D 133/08* (2013.01); *H01C 7/022* (2013.01); *H01C 7/027* (2013.01); *H01C 17/06* (2013.01); *H01C 17/06586* (2013.01); *C08F 2220/1891* (2013.01); *C08K 2201/001* (2013.01)

(58) Field of Classification Search
 CPC ..... C08K 3/04; C08K 2201/001; C08L 33/08; H01C 7/022; H01C 7/027; H01C 17/06; H01C 17/06586
 See application file for complete search history.

(56) References Cited

U.S. PATENT DOCUMENTS

| | | | | |
|---|---|---|---|---|
| 6,358,438 | B1* | 3/2002 | Isozaki | H01C 7/02 252/500 |
| 6,452,476 | B1* | 9/2002 | Handa | H01B 1/22 252/511 |
| 6,524,697 | B1* | 2/2003 | Furuyama | G01K 7/16 252/512 |
| 2002/0093007 | A1* | 7/2002 | Handa | H01C 7/027 252/500 |
| 2006/0022790 | A1 | 2/2006 | Mori | |
| 2006/0097231 | A1* | 5/2006 | Mori | H01C 7/027 252/500 |
| 2008/0039575 | A1 | 2/2008 | Mercx | |
| 2009/0069521 | A1* | 3/2009 | Nagai | C07C 309/10 526/243 |
| 2012/0296029 | A1* | 11/2012 | Liu | C08F 293/005 524/520 |
| 2013/0070380 | A1 | 3/2013 | Wang et al. | |
| 2014/0357775 | A1* | 12/2014 | Furuta | C08K 5/098 524/399 |

FOREIGN PATENT DOCUMENTS

| | | |
|---|---|---|
| CN | 1647217 A | 7/2005 |
| CN | 102105948 A | 6/2011 |
| DE | 102011080729 A1 | 2/2013 |
| JP | H11-176614 A | 7/1999 |
| JP | H11-337419 A | 12/1999 |
| JP | 2000-049004 A | 2/2000 |
| JP | 3312600 B2 | 8/2002 |
| JP | 2003-289001 A | 10/2003 |
| JP | 2005-082717 A | 3/2005 |
| JP | 3692141 B2 | 9/2005 |
| JP | 2006-013378 A | 1/2006 |
| JP | 3882622 B2 | 2/2007 |
| JP | 4126637 B2 | 7/2008 |
| JP | 5216009 B2 | 6/2013 |
| JP | 2013-159805 A | 8/2013 |
| WO | 2008/133073 A1 | 11/2008 |
| WO | 2010/110331 A1 | 9/2010 |

OTHER PUBLICATIONS

Jin Jeon et al., "Flexible Wireless Temperature Sensors Based on Ni Microparticle-Filled Binary Polymer Composites", Advanced Materials, vol. 25, pp. 850-855 (2013).

State Intellectual Property Office of People's Republic of China, First Office Action, issued in CN Patent Application No. 201580007296. 2, which is a Chinese counterpart of U.S. Appl. No. 15/115,944, dated Aug. 24, 2017, 10 pages (5 pages of English translation of Office Action, and 5 pages of Office Action).

European Patent Office, "Extended European Search Report," issued in European Patent Application No. 15 746 736.6, which is a European counterpart of U.S. Appl. No. 15/115,944, dated Aug. 4, 2017, 7 pages.

Japan Patent Office, "Notice of Reasons for Rejection," issued in Japanese Patent Application No. 2015-561029, which is a Japanese counterpart of U.S. Appl. No. 15/115,944, dated Sep. 18, 2018, 8 pages (4 pages of English translation of Office Action, and 4 page of Office Action).

\* cited by examiner

RESIN COMPOSITION FOR TEMPERATURE SENSOR, ELEMENT FOR TEMPERATURE SENSOR, TEMPERATURE SENSOR, AND METHOD FOR PRODUCING ELEMENT FOR TEMPERATURE SENSOR

TECHNICAL FIELD

The present invention relates to a resin composition for temperature sensors, an element for temperature sensors (temperature sensor element), a temperature sensor, and a method for producing an element for a temperature sensor.

Priority is claimed on Japanese Patent Application No. 2014-021767, filed Feb. 6, 2014, the content of which is incorporated herein by reference.

BACKGROUND ART

Flexible electronics made with organic semiconductors fit well on the surface of the human body or inside the body, because of the softness of the materials. Therefore, as a means of directly obtaining the biological information from cells or tissues, the use of flexible electronics has recently been attracting attention.

Temperature sensors have been attracting attention as one of their applications. Temperature sensors have been often used as switching elements for machine control and as thermal fuses. With the miniaturization and increasing complexity of the elements in recent years, there is a demand for temperature sensors that are more flexible and capable of finely adjusting the set temperature. Realization of a flexible temperature sensor capable of adjusting the set temperature close to the body temperature has been desired, since highly accurate measurements with little burden on the human body become possible in the medical field.

For example, as a temperature sensor, a temperature sensor having a characteristic in which the electric resistance value rapidly increases with a positive temperature coefficient (PTC) along with the temperature increase when reaching a certain temperature range (hereinafter, referred to as a "PTC characteristic") has been proposed. For example, in Patent Documents 1 and 2, a resin composition having the PTC characteristic has been described. A resin composition for temperature sensors that has the PTC characteristic is capable of measuring the temperature changes through thermal expansion of a polymer containing conductive particles. The conductive particles are in contact with each other at low temperatures, and the resistance value between the electrodes is low. On the other hand, when the temperature increases and exceeds a certain temperature, the polymer is thermally expanded, and the gap is formed between the conductive particles to increase the resistance value. By measuring such changes in the resistance values, it is possible to measure the temperature change. In addition, it is also possible to carry out the control of the element in accordance with the temperature of the thermal fuse or the like by utilizing the characteristic in which the resistance value rapidly increases when the temperature reaches a certain temperature or higher.

Flexibility is required of such temperature sensors, and in order to achieve the flexibility, a thinner resin composition for temperature sensors that exhibits the PTC characteristic has been required. For example, in Patent Documents 3 and 4, it has been described that it is possible to realize a resin composition for temperature sensors that has the PTC characteristic with a thickness of 20 μm by means of printing or coating.

In order to obtain a temperature sensor with higher sensitivity, a large change in the resistance value at the temperature where the PTC characteristic is exhibited (hereinafter, referred to as a "PTC temperature") has been required. If the change in the resistance value becomes larger, the output in response to the temperature change is increased, so as to constitute a temperature sensor with higher sensitivity. For example, in Patent Document 5, cocrystallization of two polymers for the purpose of increasing the change in the resistance value at the PTC temperature has been described.

In addition, in Patent Document 6, it has been described that by using a resin composition for temperature sensors that has a plurality of PTC temperatures, arbitrary PTC characteristics can be achieved in various temperature ranges.

Temperature sensors are required to exhibit cyclic repeatability of PTC characteristics in order to realize a stable measurement. In Non-Patent Document 1, a resin composition for temperature sensors with a PTC characteristic that does not change even when the temperature was changed repeatedly across the PTC temperature 100 times has been described.

CITATION LIST

Patent Documents

[Patent Document 1] Japanese Patent No. 5216009
[Patent Document 2] Japanese Patent No. 3312600
[Patent Document 3] International Patent Publication No. 2008/133073
[Patent Document 4] Japanese Patent No. 4126637
[Patent Document 5] Japanese Patent No. 3692141
[Patent Document 6] Japanese Patent No. 3882622

Non-Patent Document

[Non-Patent Document 1] J. Jeon, et al., Adv. Mater., 25, 850-855 (2013).

SUMMARY OF INVENTION

Technical Problem

The resin compositions for temperature sensors described in Patent Documents 1 and 2 exhibit changes in the resistance value with a rate of change of about $10^3 \Omega$ to $10^4 \Omega$. However, there are no descriptions of the thicknesses thereof, and they are considered to have a film thickness of at least 50 μm or more from the size of the conductive particles. In Patent Documents 1 and 2, descriptions about the cyclic repeatability are also lacking.

Although the resin compositions for temperature sensors described in Patent Documents 3 and 4 have a film thickness as thin as 20 μm, the rate of change of the resistance value thereof is about 10 to 100 times, and they could not be said to exhibit sufficient changes in the resistance value. The rate of change of the resistance value can be obtained by dividing the resistivity at a temperature equal to or higher than the PTC temperature (80° C. in Patent Document 3) by the resistivity at a temperature equal to or less than the PTC temperature (30° C. in Patent Document 3). Also for the cyclic repeatability, only a reproducibility of five repeats has been described in Patent Document 3, and it could not be said to have sufficient reproducibility.

In Patent Document 5, a resin composition for temperature sensors that is obtained by cocrystallizing two polymers has been described. The composition achieves a high resistivity change with a rate of change of the resistance value of nearly 1,000 times. However, the film thickness thereof is as thick as 250 µm. In addition, since the resin composition for temperature sensors is produced using two polymers, although they are cocrystallized and relatively stable, the possibility of the occurrence of phase separation or crystal disturbance cannot be excluded. In other words, it was not possible to produce a resin composition for temperature sensors that is sufficiently homogeneous and stable. In addition, description about the cyclic repeatability was also lacking, and the PTC temperature was also as high as 100° C.

In Patent Document 6, it has been described that by using a resin composition for temperature sensors that has a plurality of PTC temperatures, arbitrary PTC characteristics can be achieved in various temperature ranges. However, since the materials are different for each of the resin compositions for temperature sensors, the physical properties thereof are also different. Because each production conditions is different when different materials are used, it is impossible to easily produce a resin composition for temperature sensors that can achieve arbitrary PTC characteristics in various temperature ranges. In particular, when an attempt is made to produce a temperature sensor element by means of coating or the like, since the physical properties (for example, viscosity and the like) of the resin compositions for temperature sensors are different, the respective coating conditions and the like are different from each other, resulting in a problem of very poor workability. In addition, in Patent Document 6, there was also no description about the film thickness or the cyclic repeatability.

In Non-Patent Document 1, a resin composition for temperature sensors that is capable of realizing a cyclic repeatability of 100 times has been described. However, the thickness thereof was 1 mm, and it was not possible to realize the same level of cyclic repeatability when made into a thin film, which was a problem.

The present invention has been made in view of the above circumstances, and has an object of providing a resin composition for temperature sensors that includes a polymer and exhibits high flexibility, higher sensitivity and high cyclic repeatability, a temperature sensor element, a temperature sensor, and a method for producing a temperature sensor.

Solution to Problem

In order to solve the above problems, the present invention employs the following means.

(1) A resin composition for temperature sensors in which conductive particles are dispersed in an acrylic polymer obtained by copolymerizing a first acrylic monomer represented by a general formula $CH_2CHCOOX_1$ and a second acrylic monomer represented by a general formula $CH_2CHCOOX_2$.

(2) The resin composition for temperature sensors according to (1), characterized in that $X_1$ of the aforementioned first acrylic monomer is an alkyl group represented by $-(CH_2)_nCH_3$, $X_2$ of the aforementioned second acrylic monomer is an alkyl group represented by $-(CH_2)_mCH_3$, n is an integer of 13 to 21, and m is an integer of 1 to 7.

(3) The resin composition for temperature sensors according to either one of (1) and (2), characterized in that the aforementioned first acrylic monomer and the aforementioned second acrylic monomer are monomers used in shape memory resins.

(4) The resin composition for temperature sensors according to any one of (1) to (3), characterized in that, in the aforementioned acrylic polymer, a weight ratio of the aforementioned first acrylic monomer is larger than a weight ratio of the aforementioned second acrylic monomer.

(5) A temperature sensor element characterized by including two electrodes, and the resin composition for temperature sensors according to any one of (1) to (4) that is arranged so as to be sandwiched by two electrodes.

(6) A temperature sensor element characterized in that two electrodes are present on the same plane, and two electrodes are bridged by the resin composition for temperature sensors according to any one of (1) to (4).

(7) The temperature sensor element according to (6), characterized by further including an auxiliary electrode on a surface of the aforementioned resin composition for temperature sensors, on the opposite side of the aforementioned electrodes.

(8) A temperature sensor according to any one of (5) to (7), characterized by further including, between the aforementioned two electrodes, in addition to the aforementioned resin composition for temperature sensors, a second resin composition for temperature sensors with a different compounding ratio of the aforementioned first acrylic monomer and the aforementioned second acrylic monomer from that of the aforementioned resin composition for temperature sensors.

(9) A temperature sensor including the temperature sensor element of (5) to (8), and a transistor connected to either one electrode of the aforementioned temperature sensor element.

(10) A method for producing a temperature sensor element, the method characterized by including: a first step for producing an acrylic polymer by copolymerizing a first acrylic monomer and a second acrylic monomer; a second step for preparing a paste-like mixture in which conductive particles are uniformly dispersed in said acrylic polymer, by performing stirring and defoaming at the same time after imparting fluidity by melting a material obtained by adding conductive particles to said acrylic polymer or diluting the same by using a solvent; and a third step for coating or printing the aforementioned paste-like mixture between two electrodes.

Advantageous Effects of Invention

According to the present invention, it is possible to provide a resin composition for temperature sensors that includes a polymer and exhibits high flexibility, higher sensitivity and high cyclic repeatability, a temperature sensor element, a temperature sensor, and a method for producing a temperature sensor element.

DESCRIPTION OF EMBODIMENTS

Figure 1A:
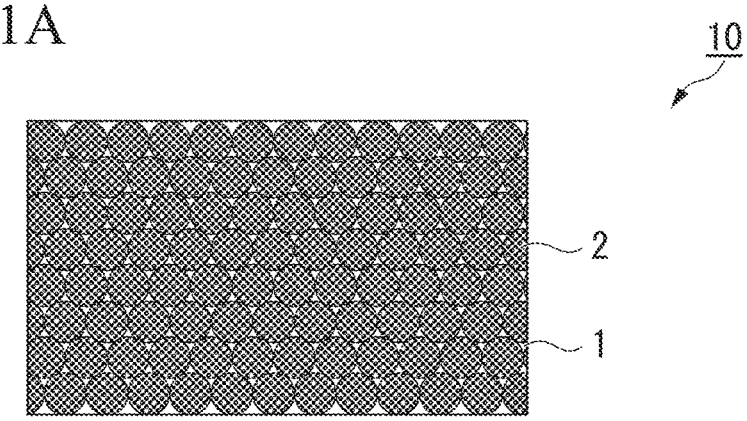
FIG. 1A is a schematic cross-sectional view schematically showing the cross section of a resin composition for temperature sensors according to an embodiment of the present invention, which is a schematic cross-sectional view of the resin composition for temperature sensors at a temperature lower than the PTC temperature.

The configurations of a resin composition for temperature sensors, an element for temperature sensors (temperature sensor element), a temperature sensor, and a method for producing a temperature sensor element according to the present invention will be described below with reference to the drawings. In the drawings used in the following description, the characteristic portions and components may be enlarged for easier understanding of characteristic features as a matter of convenience, and thus the dimensional ratio of each constituent element is not necessarily the same as the actual dimensional ratio. Materials, dimensions, and the like exemplified in the following description are merely examples, and the present invention is not limited thereto and can be carried out with appropriate modifications without departing from the gist thereof. The resin composition for temperature sensors, the temperature sensor element and the temperature sensor of the present invention may include a constituent, such as a layer that is not described below, within a range that does not impair the effects of the present invention.

(Resin Composition for Temperature Sensors)

Figure 1B:
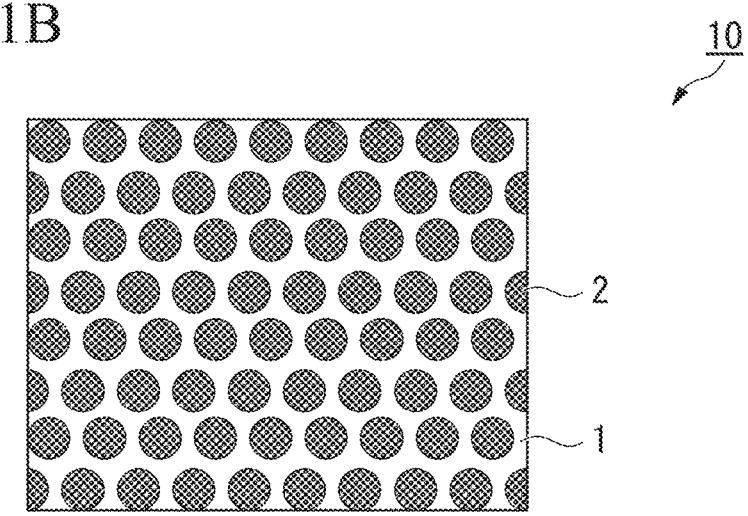
FIG. 1B is a schematic cross-sectional view schematically showing the cross-section of a resin composition for temperature sensors according to an embodiment of the present invention, which is a schematic cross-sectional view of the resin composition for temperature sensors at a temperature higher than the PTC temperature.

FIG. 1A is a diagram schematically showing the cross section of a resin composition for temperature sensors according to an embodiment of the present invention, which is a schematic cross-sectional view of the resin composition for temperature sensors at a temperature lower than the PTC temperature. FIG. 1B is a diagram schematically showing the cross section of a resin composition for temperature sensors according to an embodiment of the present invention, which is a schematic cross-sectional view of the resin composition for temperature sensors at a temperature higher than the PTC temperature.

In a resin composition 10 for temperature sensors according to an embodiment of the present invention, conductive particles 2 are dispersed in an acrylic polymer 1 obtained by copolymerizing a first acrylic monomer represented by a general formula $CH_2CHCOOX_1$ and a second acrylic monomer represented by a general formula $CH_2CHCOOX_2$. Here, the copolymerization process may be random copolymerization or block copolymerization, although it is generally random copolymerization.

At a temperature lower than the PTC temperature, as shown in FIG. 1A, since the conductive particles 2 are in contact and electrically connected with each other, the resistance value of the resin composition 10 for temperature sensors is low. On the other hand, at a temperature higher than the PTC temperature, as shown in FIG. 1B, a gap is formed between the conductive particles 2, thereby making the conduction difficult, and the resistance value of the resin composition 10 for temperature sensors becomes higher.

The PTC temperature is defined as a temperature indicating an average resistance value of a low resistance value on the low temperature side and a high resistance value on the high temperature side, relative to a temperature-sensitive region where the resistance variation with respect to the temperature is obtained. The average resistance value was calculated using the logarithmic value.

The thickness of the resin composition 10 for temperature sensors is preferably from 1 μm to 50 μm, and more preferably from 1 μm to 25 μm. When the thickness of the resin composition 10 for temperature sensors is thicker than 50 μm, it is impossible to achieve sufficient flexibility. When the thickness of the resin composition 10 for temperature sensors is thinner than 1 μm, since the number of the conductive particles 2 in the thickness direction of the resin composition 10 for temperature sensors is reduced, it is not possible to achieve an amount of change in the resistance value that is sufficiently stable with little variation depending on the location.

The melting point of the resin composition 10 for temperature sensors is preferably in the range of 30° C. to 50° C. In general, since the fluidity of the resin increases when the temperature exceeds the melting point, the effect of expansion or the like is likely to occur. Since the PTC characteristic is developed by the expansion of the resin, the melting point of the resin composition 10 for temperature sensors shows a value close to the PTC temperature of the resin composition 10 for temperature sensors. As a result of intensive investigation by the inventors of the present invention, it has been confirmed that the melting point of the resin composition 10 for temperature sensors is higher than the PTC temperature of the resin composition 10 for temperature sensors by about 10° C. Therefore, by ensuring that the melting point is within this range, it is possible to make the PTC temperature of the resin composition 10 for temperature sensors a temperature close to the body temperature. If the PTC temperature of the resin composition 10 for temperature sensors is close to the body temperature, it is possible to measure human body temperature by a temperature sensor using the resin composition 10 for temperature sensors. By using it as a thermal fuse or the like of an element to be incorporated in the human body, it is possible to prevent the element from being overheated to or above the body temperature, and to minimize the impact on the human body. The PTC temperature to be described later can be controlled by changing the composition ratio of an acrylic polymer 1 and the type of acrylic polymers prior to the polymerization of the acrylic polymer 1.

The resin composition 10 for temperature sensors exhibits fluidity during molding. More specifically, in the case of hot pressing, press molding can be easily carried out by increasing the temperature to the melting point or higher. In the case of patterning by printing, it can be used as an ink with low viscosity by being dissolved in a solvent. For example, in the case of stencil printing, the viscosity is preferably from 100 mPa·s to 10 Pa·s. In the case of ink jet printing, a viscosity in the range of 1 mPa·s to 30 mPa·s is suitable. If the viscosity is within this range, the resin composition 10 for temperature sensors can be formed by a method such as coating or printing, which makes it possible to form the resin composition 10 for temperature sensors in the form of a very thin film.

The melting point of the acrylic polymer 1 is preferably in the range of 30° C. to 50° C. Since the resin composition 10 for temperature sensors is formed by only dispersing the conductive particles 2 in the acrylic polymer 1, the melting point of the resin composition 10 for temperature sensors and that of the acrylic polymer 1 show substantially the same values. Therefore, by ensuring that the melting point of the acrylic polymer 1 is within the range, the PTC temperature of the resin composition 10 for temperature sensors can be made close to the body temperature, and the resin composition 10 for temperature sensors can be used in the human body or the like.

The acrylic polymer 1 is obtained by copolymerizing a first acrylic monomer represented by a general formula $CH_2CHCOOX_1$ and a second acrylic monomer represented by a general formula $CH_2CHCOOX_2$. The molecular weight of $X_1$ of the first acrylic monomer at this time is greater than the molecular weight of $X_2$ of the second acrylic monomer. This is because, although to be described later, the first acrylic monomer will be the main cause of the PTC temperature of the resin composition 10 for temperature sensors.

In the acrylic polymer 1, acrylic monomers are copolymerized. The acrylic polymer 1 may be composed of a single type of acrylic polymer, or may be obtained by mixing several types of acrylic polymers having different polymerization degrees. The expression "single type of acrylic polymer" means a polymer in which two acrylic monomers are polymerized in the same degree of polymerization, and the expression "mixing several types of acrylic polymers having different polymerization degrees" means that polymers composed of the same two acrylic monomers with only the degrees of polymerization being different are mixed. Since the compatibility between the acrylic polymers having different polymerization degrees is extremely high, similar to the case of a single type of acrylic polymer, phase separation or crystal disturbance does not occur. Such phase separation or crystal disturbance becomes a cause for significantly impairing the dispersion uniformity of the conductive particles that are dispersed. Therefore, it becomes difficult to achieve stable PTC characteristics. Thus, by using the acrylic polymer which is a copolymer of two acrylic monomers as the resin composition for temperature sensors, it is possible to obtain the resin composition 10 for temperature sensors which is homogeneous and stable.

The coefficient of expansion is also constant throughout such acrylic polymers when exceeding the PTC temperature. When the phase separation or the like occurs, a difference in the coefficient of thermal expansion is generated, which makes the uniform expansion difficult. That is, by being uniformly expanded, it is possible to exhibit a high resistivity change at a temperature close to the PTC temperature without causing the non-uniformity of the resistivity in the plane.

Further, by adding a solvent or the like to such acrylic polymers and coating or printing them when the viscosity is reduced, it is possible to achieve highly stable PTC characteristics even when the resin composition 10 for temperature sensors is produced by coating or printing. In the conventional polymers obtained by mixing a plurality of polymers and components, the deviation of the components occurs during the evaporation of the solvent. Such a deviation of the components also becomes a cause for greatly deteriorating the dispersion uniformity of the conductive particles that are dispersed. In other words, achievement of stable PTC characteristics is inhibited.

Both the case where the acrylic polymer 1 is composed of a single type of acrylic polymer and the case where the acrylic polymer 1 is obtained by mixing several types of acrylic polymers having different polymerization degrees have advantages, respectively. If the acrylic polymer 1 is composed of a single type of acrylic polymer, because the homogeneity of the resin composition 10 for temperature sensors can be improved, it is possible to achieve a steep PTC characteristic at the PTC temperature. On the other hand, if the acrylic polymer 1 is obtained by mixing several types of acrylic polymers having different polymerization degrees, it is possible to make the PTC characteristic smooth at the PTC temperature. That is, it is possible to adjust the sensitivity of the PTC characteristics in accordance with the mode to be measured.

The first acrylic monomer is a primary factor in setting the PTC temperature, and the second acrylic monomer has a role in adjusting the PTC temperature near the set temperature. The melting point of the acrylic polymer 1 and the melting point of the first acrylic monomer are not necessarily the same, but show similar values. In other words, by setting the melting point by changing the material of the first acrylic monomer, it is possible to set the melting point and the PTC temperature of the resin composition 10 for temperature sensors.

When the second acrylic monomer is copolymerized with the first acrylic monomer, depending on the ratio thereof, the melting point of the resulting acrylic polymer can be adjusted at around the melting point of the first acrylic monomer. Since the melting point of the acrylic polymer and the melting point of the resin composition 10 for temperature sensors are related and indicate similar values, the second acrylic monomer can adjust the PTC temperature at around the melting point of the first acrylic monomer.

As long as the molecular weight of $X_1$ of the first acrylic monomer is greater than the molecular weight of $X_2$ of the second acrylic monomer, each of their functions would not be reversed.

It is preferable that $X_1$ of the first acrylic monomer is an alkyl group represented by $-(CH_2)_nCH_3$, and $X_2$ of the second acrylic monomer is an alkyl group represented by —$(CH_2)_m CH_3$. Acrylic monomers composed of alkyl groups are easy to synthesize, can be obtained relatively easily, and have high industrial applicability, as compared to those composed of other groups, such as a group having a benzene ring or the like.

It is preferable that the value of n in the alkyl group —$(CH_2)_n CH_3$ of the first acrylic monomer is an integer from 13 to 21, and the value of m in the alkyl group —$(CH_2)_m CH_3$ of the second acrylic monomer is an integer from 1 to 7.

If n of the first acrylic monomer is an integer within the range of 13 to 21, it is possible to make the melting point of the first acrylic monomer to be from 30° C. to 50° C. The PTC temperature and the melting point of the first acrylic monomer are not necessarily the same, since the second acrylic monomer will be polymerized therewith and the conductive particles 2 will be further mixed, but show similar values. For this reason, by making the melting point of the first acrylic monomer to be from 30° C. to 50° C., it is possible to also set the PTC temperature at around the body temperature. In other words, it is possible to function as a resin composition for temperature sensors to be used in the human body or the like.

If m of the second acrylic monomer is an integer within the range of 1 to 7, it is possible to adjust the PTC temperature at around the body temperature. As described above, the melting point of the first acrylic monomer and the PTC temperature do not always coincide. Therefore, it is necessary to properly adjust the PTC temperature. If m is an integer within the range of 1 to 7, when n is the aforementioned value, it is possible to adjust the PTC temperature at around the body temperature.

In the acrylic polymer 1, the weight ratio of the first acrylic monomer is preferably greater than the weight ratio of the second acrylic monomer. If the weight ratio of the second acrylic monomer is greater than the weight ratio of the first acrylic monomer, the change in the resistance value with respect to the temperature becomes broad, and the sensitivity of the resin composition for temperature sensors is deteriorated.

For the first acrylic monomer and the second acrylic monomer, monomers used in the shape memory resins are preferably used. The shape memory resins are those having a feature that becomes soft like a rubber when heated and can be transformed to a favorite shape, and becomes hard again when returned to room temperature so that its shape can be fixed. Examples of the shape memory resins include acrylic resins, and examples of the monomers used in the shape memory resins include octadecyl acrylate (stearyl acrylate), butyl acrylate, and the like. A resin obtainable by mutually crosslinking a polymer that is formed by polymerizing octadecyl acrylate and a polymer that is formed by polymerizing butyl acrylate exhibits favorable shape memory characteristics. Because the shape memory resins are generally cross-linked, the coefficient of thermal expansion in the vicinity of the melting point thereof is not so large. However, the inventors of the present invention have found that when a polymer which is not cross-linked is formed by using a monomer used in the shape memory resin, large thermal expansion can be achieved in the vicinity of the melting point thereof. That is, by using the monomer used in the shape memory resin, the shape reproducibility is increased at around the PTC temperature of the resulting resin composition 10 for temperature sensors, and high cyclic repeatability of PTC characteristics can be achieved.

The conductive particles 2 are not particularly limited as long as they have electrical conductivity. For example, carbon black, graphite, carbon nanotubes, silver nanoparticles, gold nanoparticles, silver nanoflakes, aluminum nanoflakes, and the like can be used, and graphite and carbon black are preferred. These materials are highly stable and have an electrical conductivity that is suitable for a sensor.

The size of the conductive particles 2 is preferably from 10 nm to 10 μm. If the size of the conductive particles 2 is larger than 10 μm, the coating properties at the time of printing deteriorate. For example, when printing by means of screen printing or the like, the conductive particles 2 cannot uniformly pass through the screen mesh, which makes it difficult to form a uniform resin composition for temperature sensors. If the size of the conductive particles 2 is smaller than 10 nm, the particles easily aggregate with each other. This aggregation phenomenon not only includes aggregation during the dispersion of the conductive particles 2 in the acrylic polymer 1 but also aggregation due to the cyclic temperature history. When the conductive particles 2 aggregate in such a manner, the measurement sensitivity and the stability are impaired. Further, the conductive particles of less than 10 mm are expensive because of the costs associated with the production of small particles.

(Temperature Sensor Element)

Figure 2:
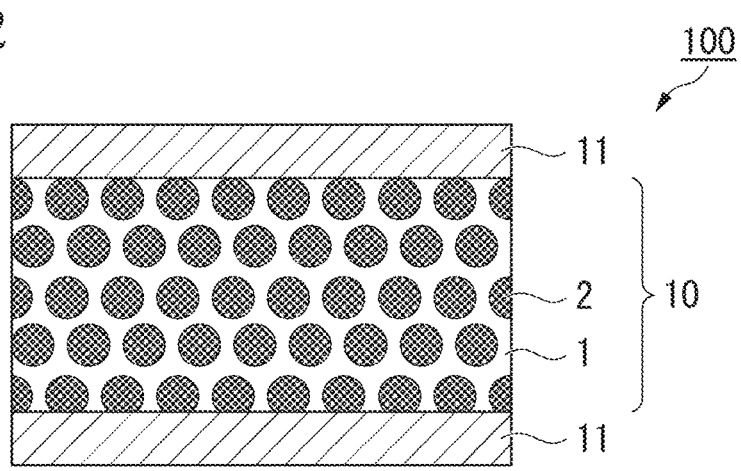
FIG. 2 is a schematic cross-sectional view schematically illustrating the cross-section of a temperature sensor element according to an embodiment of the present invention.

FIG. 2 schematically illustrates the cross section of a temperature sensor element according to an embodiment of the present invention. A temperature sensor element 100 according to an embodiment of the present invention is provided with two electrodes 11 and the resin composition 10 for temperature sensors that is placed so as to be sandwiched between the two electrodes 11.

Since the temperature sensor element 100 is a thin film, the resin composition 10 for temperature sensors is formed on a sheet. Since the resin composition 10 for temperature sensors formed on the sheet changes the volume greatly in the thickness direction, the PTC characteristic thereof also varies greatly in the thickness direction. For this reason, it is possible to obtain the temperature sensor element 100 with higher sensitivity by arranging in such a manner that the resin composition 10 for temperature sensors is sandwiched between the two electrodes 11.

Figure 3A:
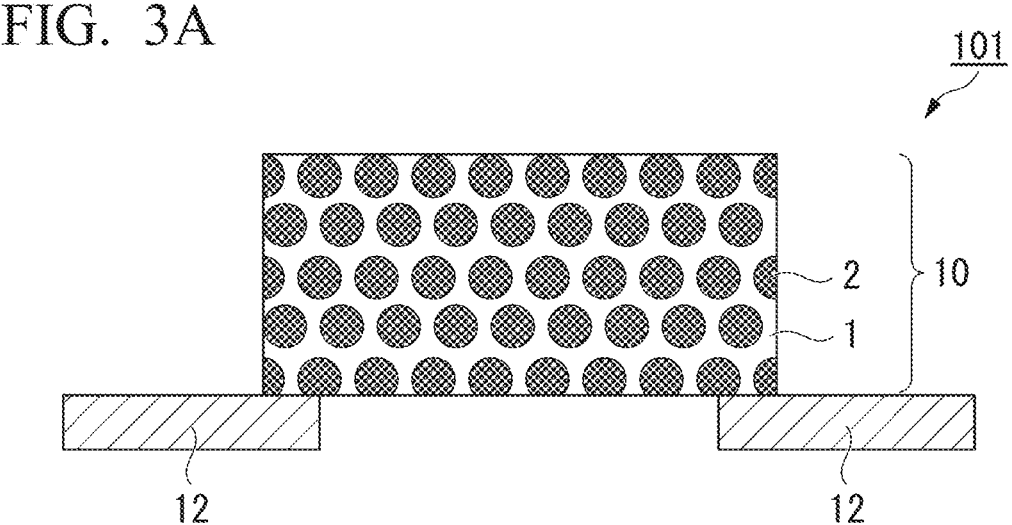
FIG. 3A is a diagram obtained by schematically illustrating the cross-section of a temperature sensor element according to another embodiment of the present invention.
Figure 3B:
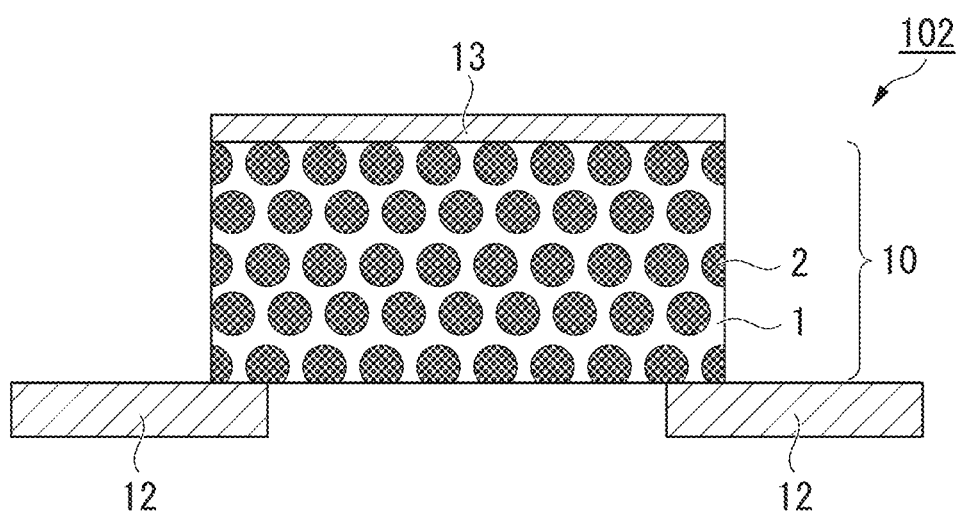
FIG. 3B is a schematic cross-sectional view of a temperature sensor element according to an embodiment of the present invention, which is a schematic cross-sectional view of the temperature sensor element having an auxiliary electrode.

FIG. 3A is a diagram obtained by schematically illustrating the cross section of a temperature sensor element according to another embodiment of the present invention. FIG. 3B is a schematic cross-sectional view of a temperature sensor element having an auxiliary electrode according to an aspect of the present invention.

In a temperature sensor element 101 according to another embodiment of the present invention, as shown in FIG. 3A, two electrodes 12 are present on the same plane, and the two electrodes 12 are bridged by the resin composition 10 for temperature sensors.

The temperature sensor element 101 having such a configuration is capable of reducing the total thickness of the temperature sensor element 101 by arranging the two electrodes 12 in parallel on the same plane. In addition, since there is no cause (electrodes and the like) to inhibit the expansion in the thickness direction thereof, the temperature sensor element 101 having such a configuration allows more accurate measurement.

As shown in FIG. 3B, the temperature sensor element may have an auxiliary electrode 13 on the surface of the resin composition 10 for temperature sensors on the opposite side of the two electrodes 12. In the temperature sensor element 101 as shown in FIG. 3A, since the two electrodes 12 are arranged in the direction parallel to the resin composition 10 for temperature sensors, the level of change in the volume at around the PTC temperature is reduced, and the amount of change in the resistance value is reduced. However, by arranging the auxiliary electrode 13 in the thickness direction of the resin composition 10 for temperature sensors so as to face the two electrodes, the temperature sensor element 102 is capable of measuring the amount of change between one electrode 12 and the auxiliary electrode 13 and the amount of change between the other electrode 12 and the auxiliary electrode 13 at the same time, and is capable of further enhancing the detection sensitivity.

A second resin composition for temperature sensors with a different compounding ratio of the first acrylic monomer and the second acrylic monomer may be further included between the two electrodes. By ensuring that the ratio of the first acrylic monomer and the second acrylic monomer is different, the second resin composition for temperature sensors has a PTC temperature that is different from that of the resin composition for temperature sensors described above. In other words, it is possible to achieve arbitrary PTC characteristics in various temperature ranges. By further including the nth (n is 3 or more) resin composition for temperature sensors with a different ratio of the first acrylic monomer and the second acrylic monomer, it is possible to measure the PTC characteristics in a wider temperature range.

Since the acrylic polymers of the respective resin compositions for temperature sensors (from the first resin composition for temperature sensors to the nth resin composition for temperature sensors) are copolymers composed of the same monomers (the first acrylic monomer and the second acrylic monomer), unnecessary contact resistance or the like does not occur among the respective resin compositions for temperature sensors, thereby allowing highly sensitive measurement. In addition, with respect to these resin compositions for temperature sensors, since it is possible to employ substantially the same coating conditions and the like at the time of producing the temperature sensor element, homogeneous elements can be easily fabricated.

(Temperature Sensor)

Figure 4:
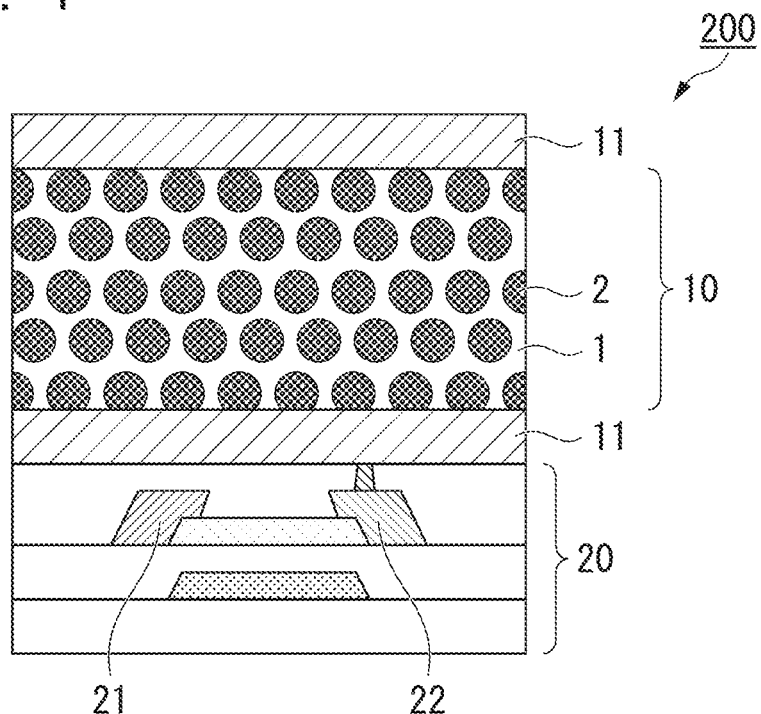
FIG. 4 is a schematic cross-sectional view of a temperature sensor according to an embodiment of the present invention.

FIG. 4 is a schematic cross-sectional view of a temperature sensor 200 according to an embodiment of the present invention. A temperature sensor includes a temperature sensor element 10 shown in FIG. 4 and a transistor 20 connected to one of electrodes of the temperature sensor element 10.

In the temperature sensor 200, the amount of current flowing through the transistor 20 is changed due to changes in the resistance value of the temperature sensor element 10, and a signal corresponding to the current value is output to the outside, thereby allowing it to function as the temperature sensor 200. For example, when a field effect transistor as shown in FIG. 4 is used as the transistor 20, the resistance value of the temperature sensor element 10 is changed at around the PTC temperature, and the current flowing between a source electrode 21 and a drain electrode 22 is changed. For example, when the temperature rises at around the PTC temperature, the amount of current flowing between the source electrode 21 and the drain electrode 22 is reduced as a result. It is possible to measure the temperature change by measuring the amount of this flowing current.

The total thickness of the temperature sensor 200 is preferably not more than 100 μm. Furthermore, if it is thinner than 50 μm, it can even follow complex shapes as a highly flexible temperature sensor.

Figure 5:
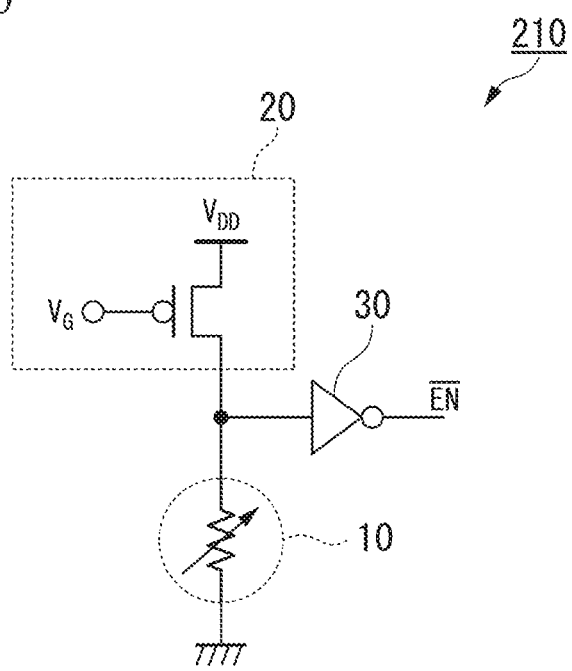
FIG. 5 is a schematic circuit diagram of a temperature sensor according to another embodiment of the present invention.

The temperature sensor is not limited to the configuration of FIG. 4. For example, the temperature sensor may have a circuit structure as shown in FIG. 5. FIG. 5 is a schematic circuit diagram of a temperature sensor according to an embodiment of the present invention. A temperature sensor 210 in FIG. 5 includes a temperature sensor element 10 and a transistor 20 connected to the temperature sensor element 10, and outputs a voltage at the connection portion to the outside through a diode 30.

At this time, the voltage output from the diode 30 to the outside satisfies the following relational expression (1):

$$V_{EN} = V_{DD} \times (R_t / (R_g + R_t)) \quad (1)$$

where $V_{EN}$ is the voltage applied on the EN portion in the diagram which is a voltage output to the outside, $V_{DD}$ is the drain voltage, $R_g$ is the resistance value of the transistor 20, and $R_t$ is the resistance value of the temperature sensor element 10.

When the gate voltage $V_G$ is changed, the resistance value $R_g$ of the transistor 20 changes, thereby changing the voltage $V_{EN}$ outputted to the outside as indicated by the relational expression (1). In other words, by changing the gate voltage $V_G$ of the transistor 20, the temperature sensor 210 is capable of changing the voltage $V_{EN}$ outputted to the outside. Since a measurer measures the PTC characteristic by the voltage $V_{EN}$ outputted to the outside, the ability to adjust the voltage $V_{EN}$ outputted to the outside means that the temperature at which the PTC characteristic of the temperature sensor 210 as a whole is expressed can be adjusted. Therefore, even in the case of using the temperature sensor element 10 that indicates a predetermined change in the resistance value with respect to a certain PTC temperature, it is possible to adjust the temperature at which the PTC characteristic of the temperature sensor 210 as a whole is expressed. The temperature sensor 210 configured in such a manner is capable of enhancing the versatility of the temperature sensor element 10. In addition, the temperature sensor 210 can be used in a wide range of applications, because it is possible to adjust the temperature at which the PTC characteristic is expressed, by only changing the gate voltage $V_G$ in accordance with the measurement mode.

The transistor 20 is preferably an organic transistor since the temperature sensors 200 and 210 are flexible. The structure thereof is not particularly limited, although it is possible to use a field effect transistor or the like, for example, as shown in FIG. 4.

In addition, in general, the on-resistance of the organic transistor is high on the order of MΩ, and it is considered desirable that in order to vary the potential difference between the source electrode 21 and the drain electrode 22, the resistance change of the temperature sensor element 10 varies on the order from a few MΩ to 100 kΩ. The temperature sensor element 10 according to the present embodiment can be suitably used because it indicates a wide range of change in the resistance value.

Figure 6:
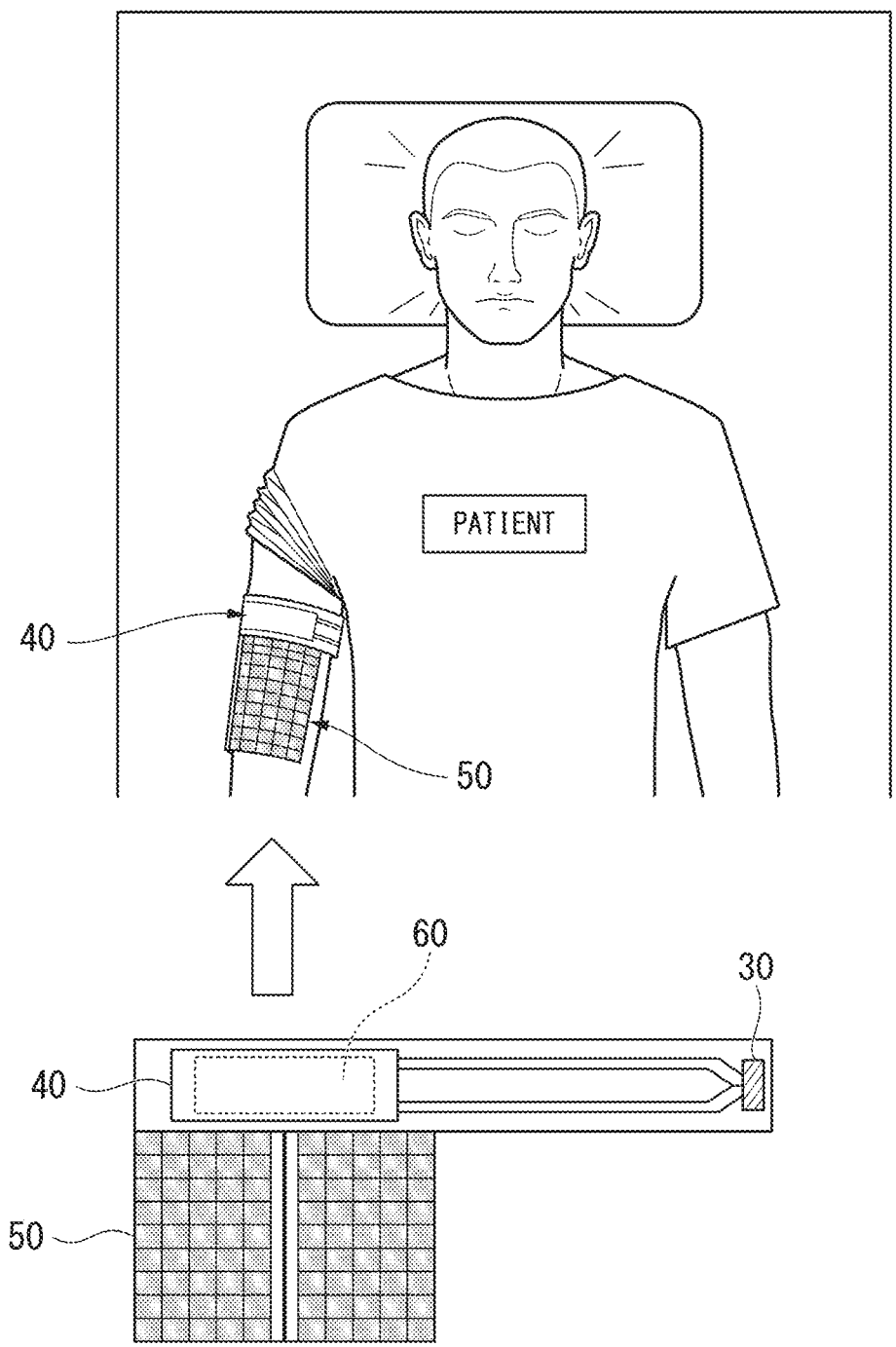
FIG. 6 is a diagram showing the mode of use of a temperature sensor according to an embodiment of the present invention.

The temperature sensor may include members other than the above-described components. For example, as shown in FIG. 6, a circuit 40 including an organic transistor connected to the temperature sensor element, a solar cell 50 connected to the circuit, and a speaker 60 arranged on the back surface of the circuit may be included. The temperature sensor element changes the resistance value in accordance with the temperature variation, and the circuit 40 reads this change in the resistance value. The circuit 40 communicates this information to the speaker 60, and sound is output from the speaker 60. The circuit 40 and the speaker 60 are driven by using the solar cell 50 as a power source. Therefore, for example, as shown in FIG. 6, it can also be wrapped around the body surface of a person and function as a simple temperature sensor exhibiting high followability.

(Method for Producing Temperature Sensor Element)

A method for producing a temperature sensor element according to an embodiment of the present invention includes: a first step for producing an acrylic polymer by copolymerizing a first acrylic monomer and a second acrylic monomer; a second step for preparing a paste-like mixture in which conductive particles are uniformly dispersed in said acrylic polymer, by performing stirring and defoaming at the same time after imparting fluidity by melting a material obtained by adding conductive particles to said acrylic polymer or diluting the same by using a solvent; and a third step for coating the paste-like mixture between the two electrodes.

In the first step, the first acrylic monomer and the second acrylic monomer are copolymerized to produce an acrylic polymer. The composition ratio of the first acrylic monomer and the second acrylic monomer can be adjusted depending on the PTC temperature to be required.

The copolymerization can be carried out, for example, by adding a photocatalyst, followed by UV irradiation. At this time, as the photocatalyst, a photoradical polymerization initiator can be used by selecting a suitable one from those that are generally available. For example, as a UV polymerization initiator, 2,2-dimethoxy-2-phenylacetophenone is preferred. It has a sensitivity over a relatively wide range of UV wavelengths, and is capable of carrying out the polymerization with a relatively inexpensive light source.

The UV irradiation time is preferably at least 10 minutes and within 2 hours. If it is shorter than 10 minutes, it is not possible to allow the copolymerization reaction to proceed. If it is within 2 hours, the copolymerization reaction has advanced sufficiently. Therefore, it is not efficient in terms of productivity to be subjected to UV irradiation any longer.

In the second step, a material obtained by adding conductive particles to the acrylic polymer is melted or diluted with a solvent to impart fluidity, and stirring and defoaming are performed at the same time, thereby producing a paste-like mixture in which conductive particles are uniformly dispersed in the acrylic polymer.

In this step, it is important to subject the material imparted with fluidity to stirring and defoaming at the same time. When an attempt is made to disperse the conductive particles in the material imparted with fluidity, it is not possible to sufficiently disperse the conductive particles in some cases by the stirring using a conventional stirrer or the like. This tendency becomes remarkable especially with the material with high viscosity. On the other hand, if stirring and defoaming are carried out simultaneously, it is possible to prepare a paste-like mixture in which the conductive particles are uniformly dispersed in the material imparted with fluidity. It is possible to carry out the stirring and defoaming at the same time by using, for example, the THINKY MIXER "Awatori Rentaro" (trade name) manufactured by Thinky Corporation. The term "fluidity" may refer to a state that cannot maintain a constant shape, and the level of viscosity or the like is not particularly limited.

The weight ratio of the conductive particles relative to the acrylic polymer is preferably in the range from 10:1 to 2:1 in the case of using a carbon material such as carbon black as the conductive particles. In the case of using a metal material as the conductive particles, the weight ratio is preferably in the range from 1:1 to 1:5. When the weight ratio of the conductive particles is too small, it is impossible to secure a sufficient conductive path even at a temperature equal to or less than the PTC temperature, and the sensitivity of the temperature sensor element is deteriorated. When the weight ratio of the conductive particles is too large, it is difficult to uniformly disperse the conductive particles in the acrylic polymer.

In the third step, the paste-like mixture is coated or printed between the two electrodes. The expression "paste-like mixture is coated or printed between the two electrodes" means that the paste-like mixture is coated or printed onto either one of the electrodes, and then the other electrode is installed, in the case of preparing the temperature sensor element 100 as shown in FIG. 2; and means that the paste-like mixture is coated or printed so as to bridge between the two electrodes, in the case of preparing the temperature sensor element 101 as shown in FIGS. 3A and 3B.

The coating method is not particularly limited, and it is possible to employ a direct coating method using a dispenser or an ink jet.

As the printing method, screen printing, gravure printing, stencil printing or the like can be used.

It is also preferable to perform defoaming during coating or printing. When the resin composition for temperature sensors bites air, the PTC characteristic is deteriorated.

In the third step, since the paste-like mixture has high viscosity, it is preferable to mix a solvent before coating or printing. As the solvent, it is possible to use 4-methyl-2-pentanone and other common solvents for acrylic resins. It is preferable to mix the solvent so that the added amount thereof, relative to the paste-like mixture, is in the range of 10 wt % to 50 wt %. When the amount of the solvent is too small, it is not possible to sufficiently alleviate the viscosity. When the solvent is in excess, the solvent remains inside to deteriorate the PTC characteristics due to the aggregation of the conductive particles or the like, which is a problem.

As a means other than the coating or printing, by applying, to the paste-like mixture, heat at a temperature equal to or higher than the melting point and applying a suitable pressure, it is also possible to form a plate-like resin composition for temperature sensors. Although a "suitable pressure" may vary depending on the resin composition for temperature sensors to be required, it means that a force is applied until the paste-like mixture reaches a target thickness, and it does not mean that a high pressure or the like is applied.

EXAMPLES

Examples of the present invention will be described below. The present invention is not limited only to the following Examples.

Example 1

Octadecyl acrylate was used as a first acrylic monomer, and butyl acrylate was used as a second acrylic monomer. Octadecyl acrylate and butyl acrylate were prepared in a weight ratio of 60 wt %:40 wt %, and these two monomers were subjected to UV irradiation for 1 hour to copolymerize using 2,2-dimethoxy-2-phenylacetophenone as a photocatalyst, thereby obtaining an acrylic polymer.

0.6 g of the acrylic polymer and 0.2 g of graphene serving as conductive particles were subjected to stirring and defoaming at the same time using the THINKY MIXER "Awatori Rentaro" (trade name, manufactured by Thinky Corporation) to obtain a paste-like mixture. A resin composition for temperature sensors was produced by applying pressure to this paste-like mixture at a temperature of 40° C. until a thickness of 25 µm was achieved.

Example 2

In Example 2, a resin composition for temperature sensors was produced under the same conditions as in Example 1 with the exception that the weight ratio of the first acrylic monomer and the second acrylic monomer was changed to 70 wt %: 30 wt %.

Example 3

In Example 3, a resin composition for temperature sensors was produced under the same conditions as in Example 1 with the exception that the weight ratio of the first acrylic monomer and the second acrylic monomer was changed to 75 wt %: 25 wt %.

Example 4

In Example 4, a resin composition for temperature sensors was produced under the same conditions as in Example 1 with the exception that the weight ratio of the first acrylic monomer and the second acrylic monomer was changed to 80 wt %: 20 wt %.

Example 5

In Example 5, a resin composition for temperature sensors was produced under the same conditions as in Example 1 with the exception that the weight ratio of the first acrylic monomer and the second acrylic monomer was changed to 90 wt %: 10 wt %.

Figure 7A:
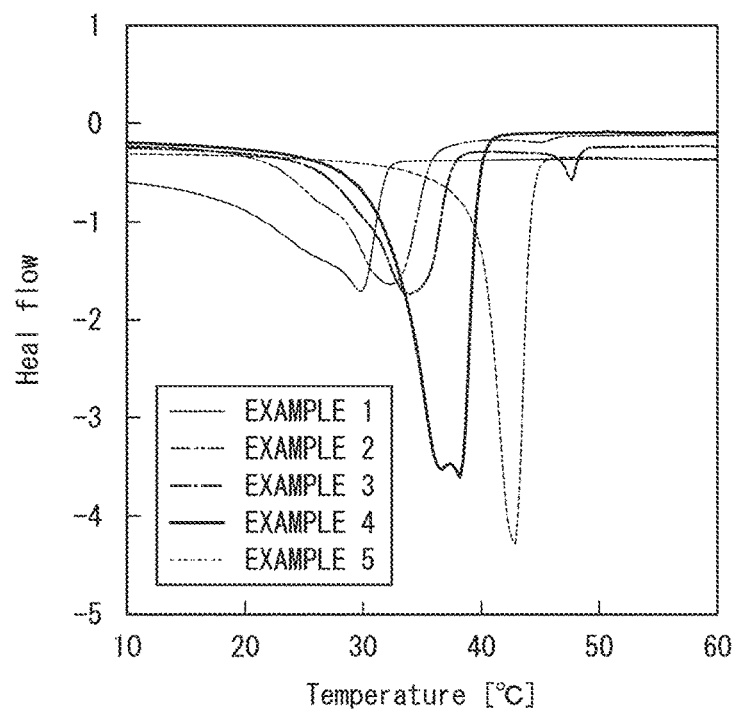
FIG. 7A is a graph obtained by measuring the heat of fusion of acrylic polymers of Examples 1 to 5.
Figure 7B:
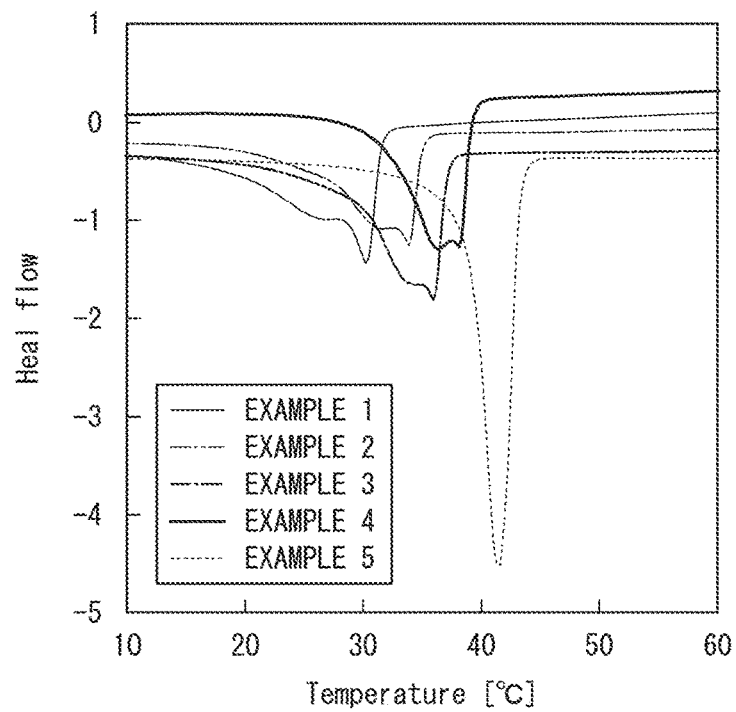
FIG. 7B is a graph obtained by measuring the heat of fusion of resin compositions for temperature sensors of Examples 1 to 5.

FIG. 7A is a graph obtained by measuring the heat of fusion of the acrylic polymers of Examples 1 to 5, and FIG. 7B is a graph obtained by measuring the heat of fusion of the resin compositions for temperature sensors of Examples 1 to 5.

The following Table 1 shows the respective melting points determined from the endothermic peaks in the graph.

TABLE 1

| | | | | | |
|---|---|---|---|---|---|
| Weight ratio of first acrylic monomer (wt %) | 60 | 70 | 75 | 80 | 90 |
| Weight ratio of second acrylic monomer (wt %) | 40 | 30 | 25 | 20 | 10 |
| Melting point of acrylic polymer (° C.) | 29.79 | 32.29 | 33.96 | 38.07 | 42.72 |
| Melting point of resin composition for temperature sensors (° C.) | 30.30 | 33.97 | 35.95 | 36.30 | 41.55 |

From FIG. 7A, FIG. 7B and Table 1, it is clear that each endothermic peak has changed. In other words, it can be seen that the melting points of the acrylic polymers and the resin compositions for temperature sensors were changed by changing the weight ratio of the acrylic monomers constituting the acrylic polymer. In addition, it is apparent that the melting points of the acrylic polymers and the melting points of the resin compositions for temperature sensors are at substantially the same temperature.

The heat of fusion was measured using the "DSC 1 differential scanning calorimeter" manufactured by Mettler-Toledo International Inc. as a differential scanning calorimeter.

Figure 8:
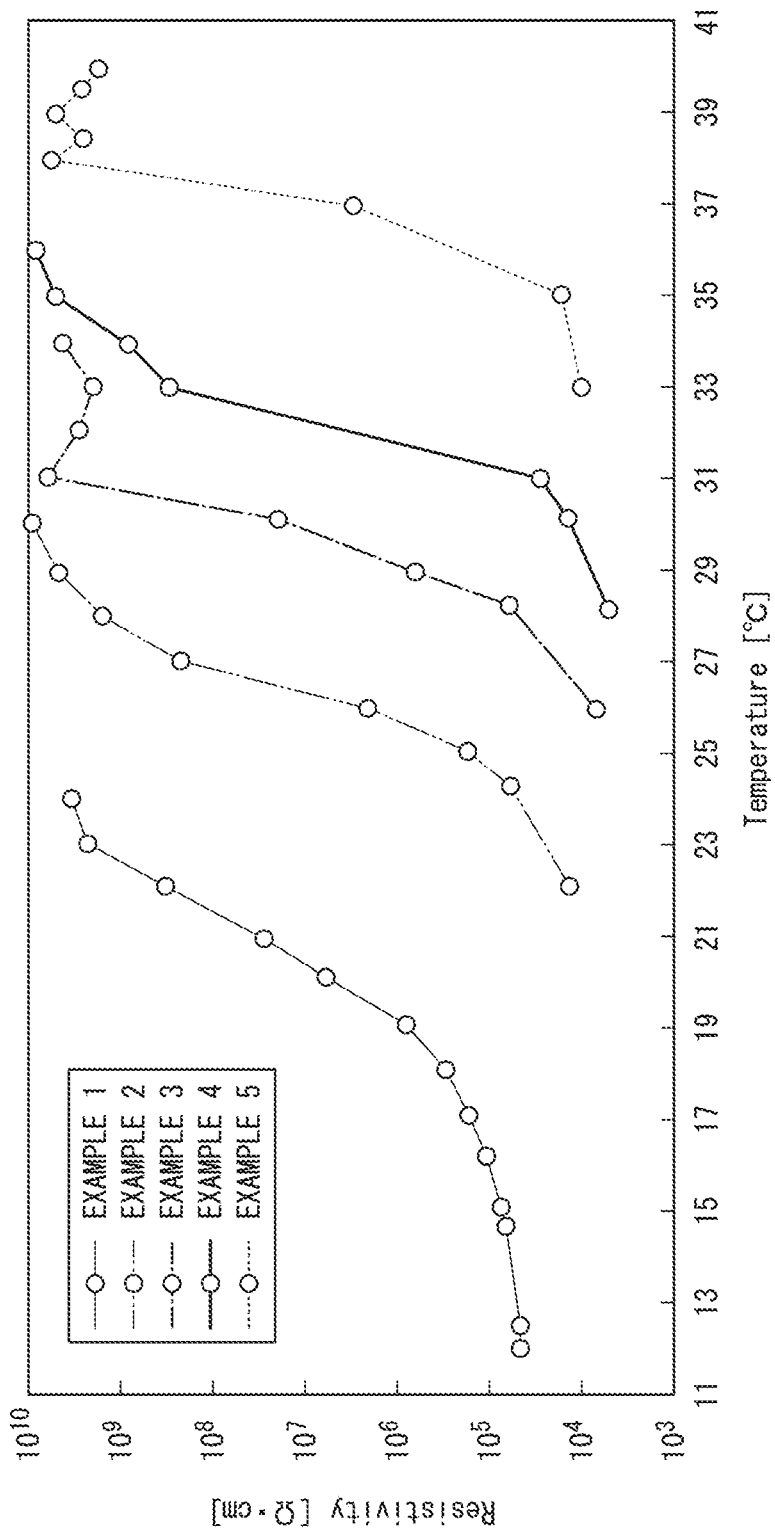
FIG. 8 is a graph obtained by measuring PTC characteristics of temperature sensor elements produced using each of the resin compositions for temperature sensors of Examples 1 to 5.

FIG. 8 is a graph obtained by measuring the PTC characteristics of the temperature sensor elements produced by using each of the resin compositions for temperature sensors of Examples 1 to 5. The vertical axis represents the resistance value (Ω·cm), and the horizontal axis represents the temperature (° C.). For the PTC characteristics, two electrodes were placed so as to sandwich the resin composition for temperature sensors to produce a temperature sensor element with a laminated structure composed of (electrode)/(resin composition for temperature sensors)/(electrode) and a thickness of 175 µm, and the change in the resistance value between each of the electrodes was measured. Here, a polyimide having a thickness of 75 µm was used for a sheet in which the electrodes were formed. However, this is for measuring the PTC characteristics in a flat state. For example, a temperature sensor element having a thickness of 50 µm can be produced by using a polyimide having a thickness of 12.5 µm. As a result, it is clear that the resistance value has changed from the order of $10^4$ to the order of $10^9$ at around the PTC temperature. In other words, it can be seen that the resin compositions for temperature sensors having very high sensitivity were obtained. The PTC temperature of the resin composition for temperature sensors can be adjusted by changing the weight ratio of the first acrylic monomer and the second acrylic monomer. By using octadecyl acrylate as the first acrylic monomer and butyl acrylate as the second acrylic monomer, the resin composition for temperature sensors that changes the characteristic near the human body temperature can be obtained.

When the weight ratio of the second acrylic monomer in the resin composition for temperature sensors is increased, it is clear that the change in the resistance value is moderate relative to the temperature change. If the weight ratio of the first acrylic monomer relative to the second acrylic monomer is larger, it is possible to obtain a resin composition for temperature sensors with higher sensitivity.

Figure 9:
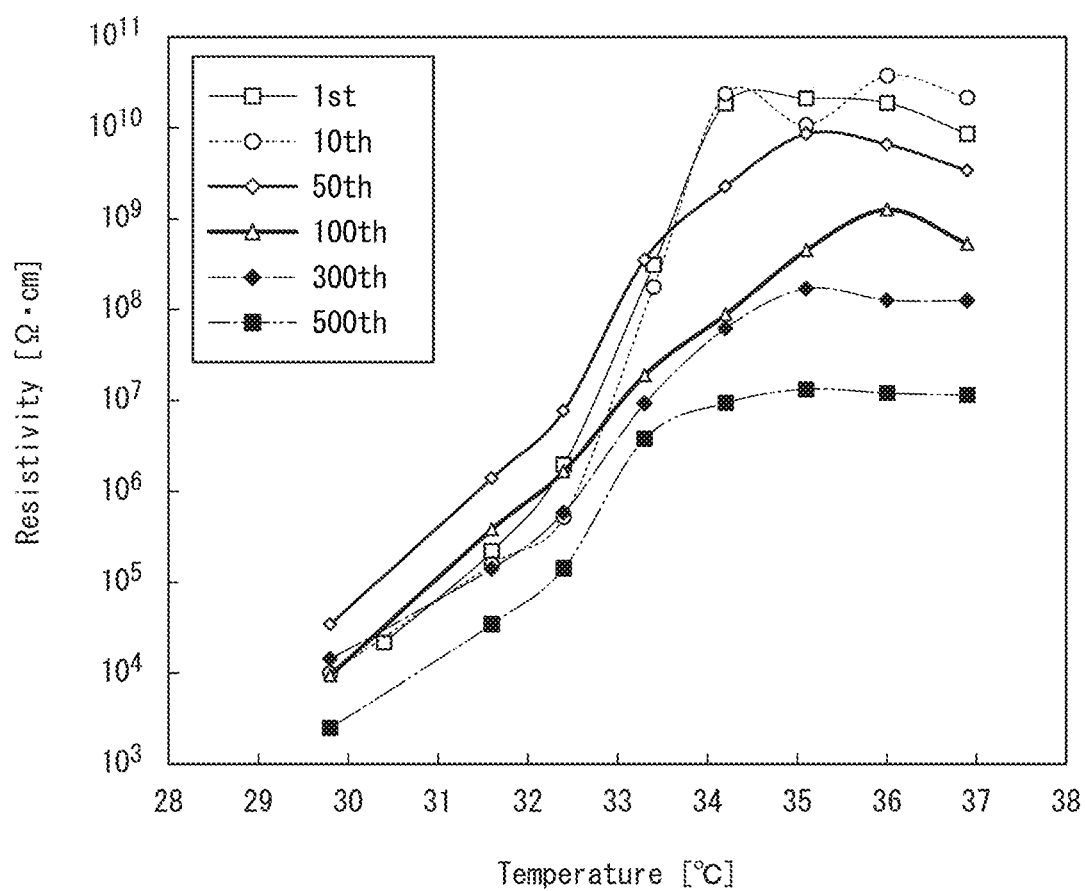
FIG. 9 is a graph obtained by measuring the cyclic repeatability of a temperature sensor element using the resin composition for temperature sensors of Example 4.

FIG. 9 is a graph obtained by measuring the cyclic repeatability of a temperature sensor element using the resin composition for temperature sensors of Example 4. The temperature of the temperature sensor element using the resin composition for temperature sensors of Example 4 was increased 500 times between from 30° C. to 37° C. to measure the resistance value. As a result, at the first temperature increase and the 50th temperature increase, deterioration in the PTC characteristic was hardly confirmed. In addition, exhibition of the PTC characteristics was confirmed even at the 500th temperature increase. In other words, it can be seen that the temperature sensor element with very high cyclic repeatability was obtained.

Figure 10:
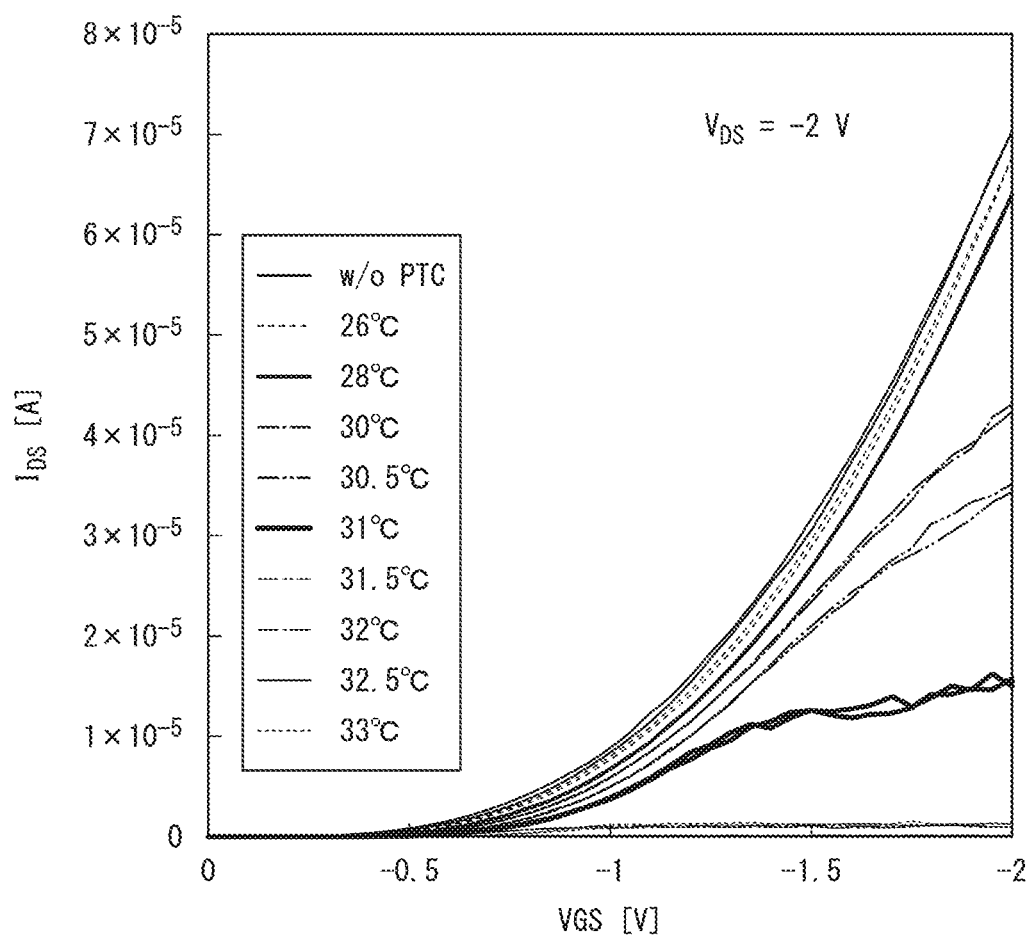
FIG. 10 is a graph obtained by measuring the temperature dependence of the drain current value with respect to the gate voltage of a temperature sensor using the resin composition for temperature sensors of Example 3.

FIG. 10 is a graph obtained by measuring the temperature dependence of the drain current value with respect to the gate voltage of a temperature sensor using the resin composition for temperature sensors of Example 3. The drain voltage was set to −2 V, and the gate voltage was changed from 0 V to −2 V. Further, in the drawing, "w/o PTC" shows a case that does not include a PTC element.

The temperature sensor was produced by connecting the resin composition for temperature sensors of Example 3 with a temperature sensor element having a laminated structure sandwiched by two electrodes, and either one of the electrodes of the temperature sensor element with the source electrode. As the temperature of the resin composition for temperature sensors is increased, the amount of the drain current is reduced. This is because the potential difference between the source electrode and the drain electrode is reduced, and the amount of drain current is reduced. The potential difference is reduced because, as the temperature of the resin composition for temperature sensors increases, the resistance value of the resin composition for temperature sensors increases and the amount of current flowing to the source electrode is reduced.

That is, it is functioning as a temperature sensor to output the resistance value by inputting the temperature value.

Example 6

In Example 6, a resin composition for temperature sensors was produced under the same conditions as in Example 4. The resin composition for temperature sensors was arranged so as to bridge two electrodes placed on the same plane to produce a temperature sensor element. The thickness of the temperature sensor element was 100 μm. A temperature sensor element thinner than the temperature sensor element of Example 4 was obtained.

Figure 11:
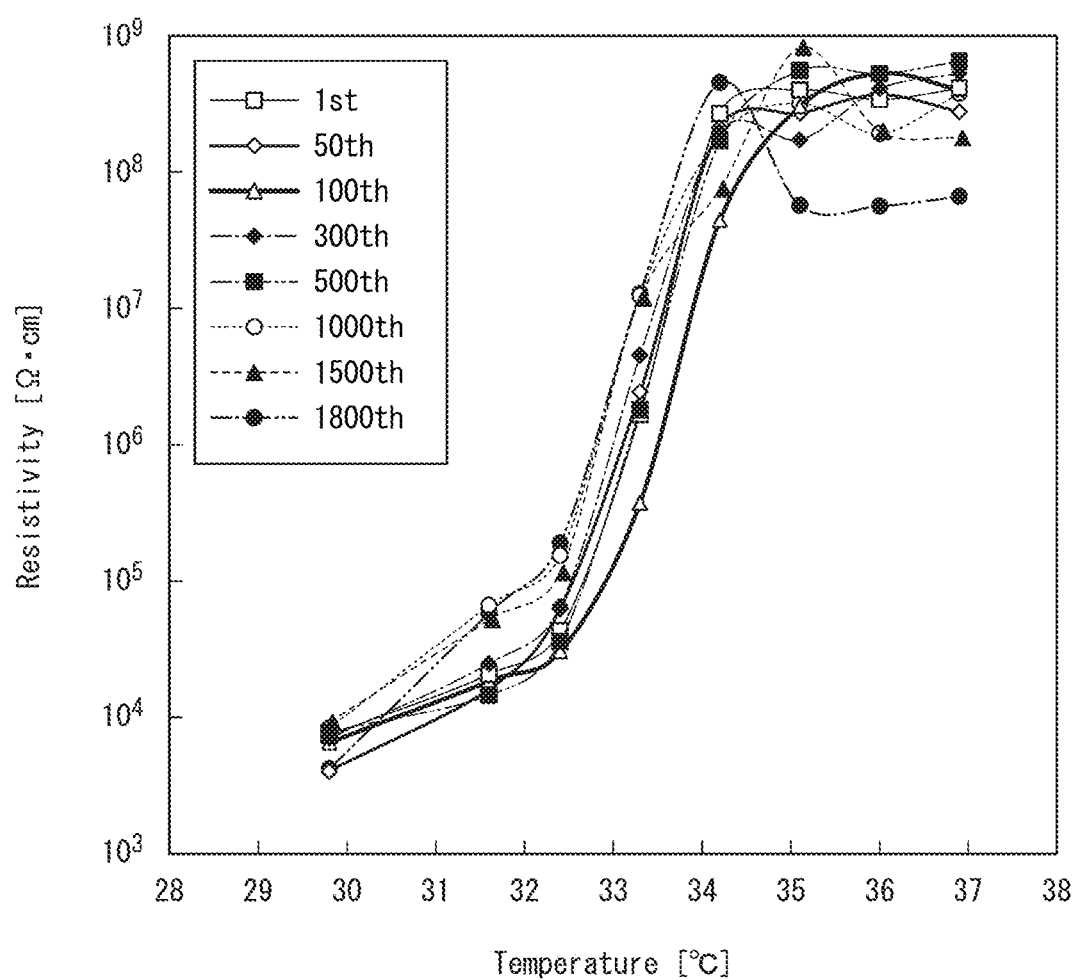
FIG. 11 is a diagram obtained by measuring the cyclic repeatability of the PTC characteristic of a temperature sensor element of Example 6.

FIG. 11 is a diagram obtained by measuring the cyclic repeatability of the PTC characteristic of the temperature sensor element of Example 6. The vertical axis represents the resistance value between the electrodes at each temperature, and the horizontal axis represents the temperature. The temperature of the temperature sensor element using the resin composition for temperature sensors of Example 6 was increased 1,800 times between from 30° C. to 37° C. to measure the resistance value. As a result, a steep PTC characteristic was exhibited even at the 1,800th temperature increase, showing little deterioration of the PTC characteristic as compared with the first temperature increase. In other words, it can be seen that the temperature sensor element with even higher cyclic repeatability was obtained by placing the electrodes on the same plane.

Example 7

In Example 7, a resin composition for temperature sensors was produced under the same conditions as those for the resin composition for temperature sensors of Example 3, with the exception that the paste-like mixture was coated directly to the electrodes without any pressure being applied. In addition, the temperature sensor element was prepared to have a laminated structure composed of (electrode)/(resin composition for temperature sensors)/(electrode). The thickness of the resin composition for temperature sensors produced by the coating process at this time was 25 μm.

Figure 12:
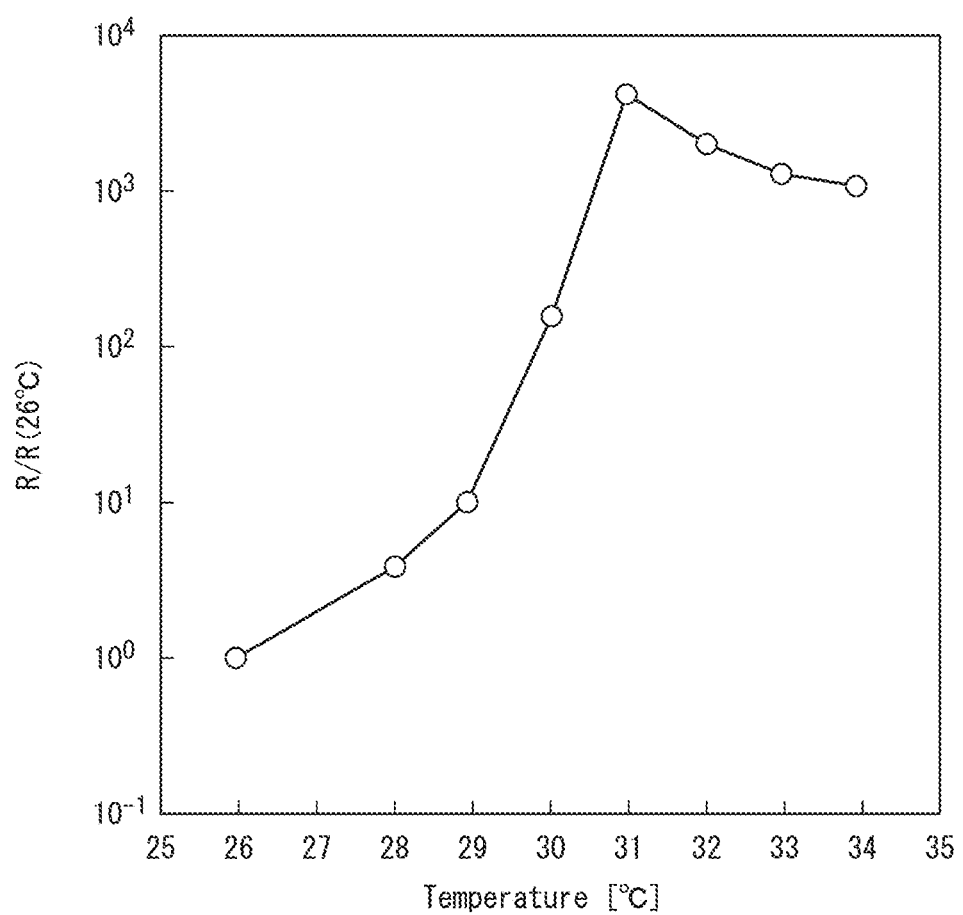
FIG. 12 is a diagram obtained by measuring the PTC characteristic of a temperature sensor element of Example 7.

FIG. 12 is a diagram obtained by measuring the PTC characteristic of the temperature sensor element of Example 7. The vertical axis represents the resistance value between the electrodes at each temperature with respect to the resistance value between the electrodes at 26° C., and the horizontal axis represents the temperature. The temperature sensor element of Example 7 exhibited a sufficient PTC characteristic by showing a resistance value, at a temperature equal to or higher than the PTC temperature, of almost 10,000 times as large as the resistance value between the electrodes at 26° C. which was equal to or less than the PTC temperature. In other words, a sufficient PTC characteristic was achieved even with a very thin temperature sensor element obtained by the coating process.

Example 8

Figure 13:
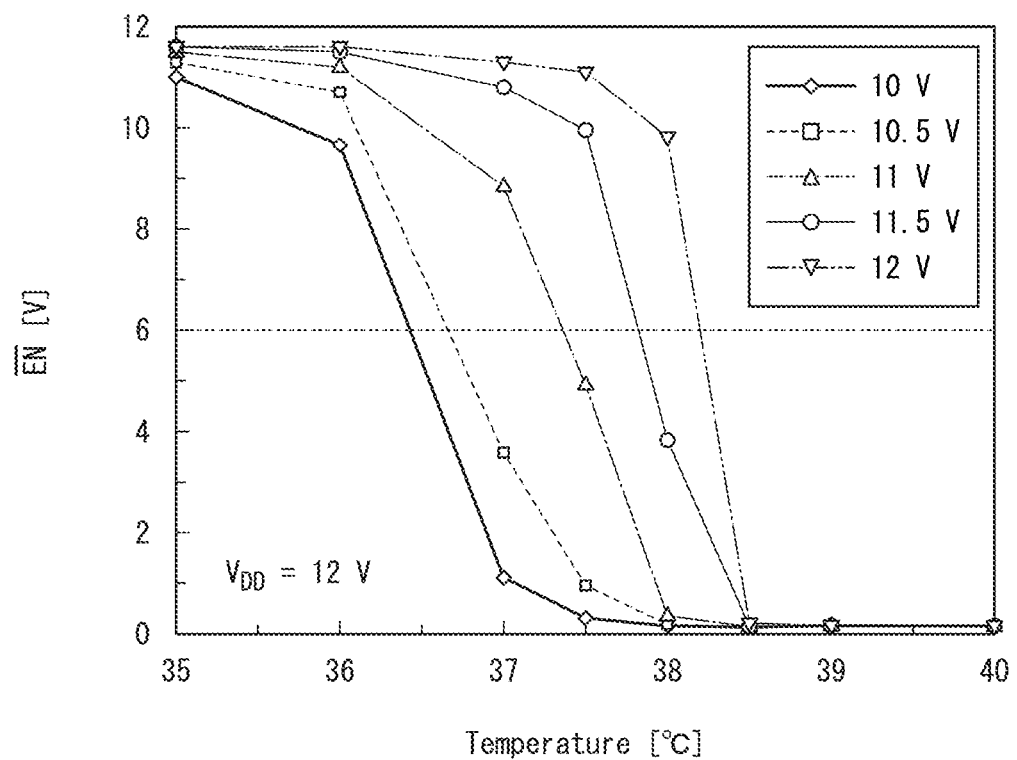
FIG. 13 is a graph obtained by measuring changes in the resistance value with respect to the temperature of a temperature sensor of Example 8 at various gate voltages.

In Example 8, a temperature sensor having a circuit structure of FIG. 5 was produced using the temperature sensor element of Example 5. FIG. 13 is a graph obtained by measuring the change in the resistance value with respect to the temperature of the temperature sensor of Example 8 at various gate voltages. The gate voltages $V_G$ were 10 V, 10.5 V, 11 V, 11.5V, and 12V, respectively, and the temperature change of the voltage $V_{EN}$ outputted to the outside was measured. At this time, the drain voltage was 12 V. The PTC characteristic of the temperature sensor element of Example 5 varies greatly around the vicinity of 37° C., as shown in FIG. 8. A temperature sensor using this temperature sensor element originally shows only a PTC characteristic centered on this temperature. However, as shown in FIG. 13, it is possible to adjust the PTC temperature by employing a circuit structure as shown in FIG. 5 to the temperature sensor and changing the gate voltage $V_G$ to be applied. In FIG. 13, it was possible to change the PTC temperature by about 1 degree by changing the gate voltage $V_G$ to be applied by 1 V.

Example 9

Example 9 is different from Examples 1 to 5 in that a plurality of acrylic polymers with different polymerization degrees are mixed. A resin composition for temperature sensors of Example 9 was produced by mixing a first acrylic polymer in which the weight ratio of octadecyl acrylate and butyl acrylate was set to 75 wt %: 25 wt %, and a second acrylic polymer in which the weight ratio of octadecyl acrylate and butyl acrylate was set to 90 wt %: 10 wt %, at a ratio of 1:1. Mixing was carried out by stirring for one hour using a magnetic stirrer at a temperature condition of 50° C. The polymerization ratio of each acrylic polymer corresponds to the weight ratio of each polymer at the time of production.

Figure 14:
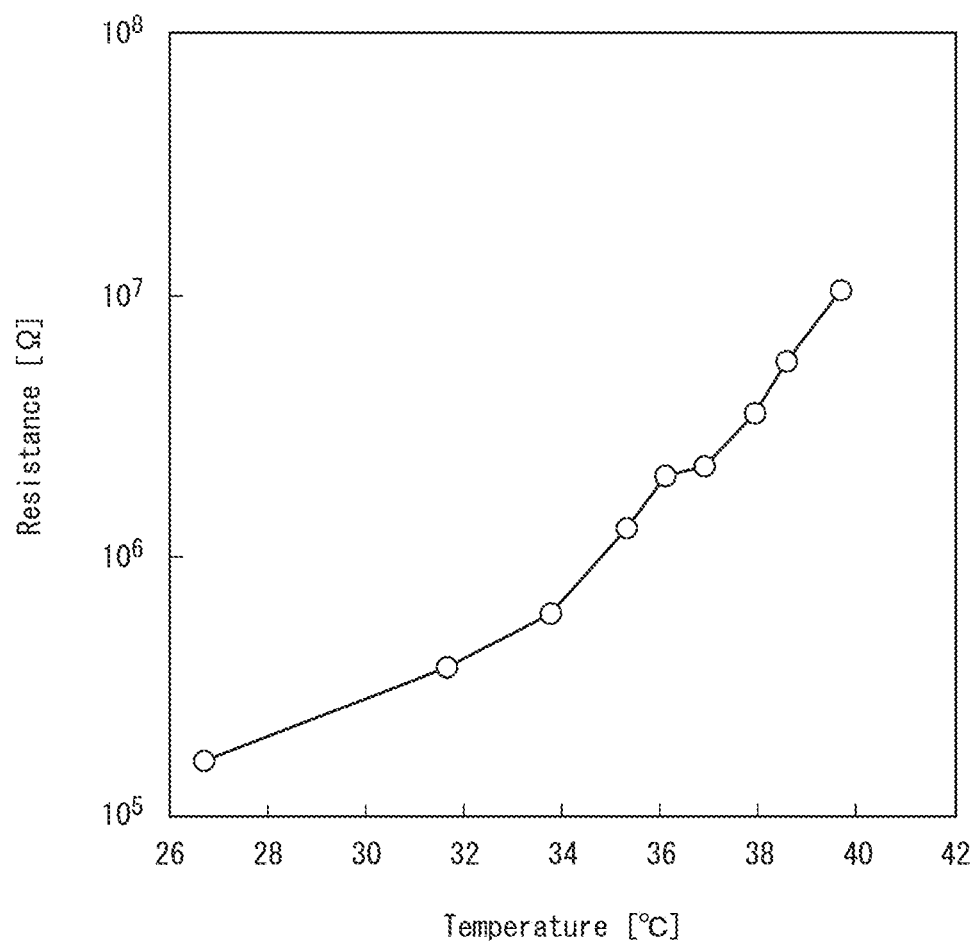
FIG. 14 is a diagram obtained by measuring the PTC characteristic of a temperature sensor element of Example 9.

In FIG. 14, the PTC characteristic of the temperature sensor element of Example 9 was measured. As a result, it can be seen that the PTC characteristic is broadened, as compared with the temperature sensor elements composed of a single type of acrylic polymer (Examples 1 to 5).

REFERENCE SIGNS LIST

1: Acrylic polymer; 2: Conductive particles; 10: Resin composition for temperature sensors; 11, 12: Electrode; 13: Auxiliary electrode; 100, 101, 102: Temperature sensor element; 20: Transistor; 21: Source electrode; 22: Drain electrode; 30: Diode; 200, 210: Temperature sensor

The invention claimed is:
1. A resin composition as being or constituting a temperature sensor,
   the resin composition in which conductive particles are dispersed in an acrylic polymer obtained by copolymerizing a first acrylic monomer represented by a general formula $CH_2CHCOOX_1$ and a second acrylic monomer represented by a general formula $CH_2CHCOOX_2$,
wherein
   $X_1$ of said first acrylic monomer is an alkyl group represented by $-(CH_2)_nCH_3$,
   $X_2$ of said second acrylic monomer is an alkyl group represented by $-(CH_2)_mCH_3$,
   n is an integer of 13 to 21, and
   m is an integer of 1 to 7.
2. The resin composition as being or constituting a temperature sensor according to claim 1,
   wherein said first acrylic monomer and said second acrylic monomer are monomers used in shape memory resins.
3. The resin composition as being or constituting a temperature sensor according to claim 1, wherein, in said acrylic polymer, a weight ratio of said first acrylic monomer is greater than a weight ratio of said second acrylic monomer.

4. A temperature sensor element comprising
two electrodes, and
the resin composition as being or constituting a temperature sensor according to claim 1 that is arranged so as to be sandwiched by the two electrodes.

5. The temperature sensor element according to claim 4, further comprising, between said two electrodes, in addition to said resin composition as being or constituting a temperature sensor, a second resin composition as being or constituting a temperature sensor with a different compounding ratio of said first acrylic monomer and said second acrylic monomer from that of said resin composition as being or constituting a temperature sensor.

6. A temperature sensor comprising:
the temperature sensor element of claim 4; and
a transistor connected to either one electrode of said temperature sensor element.

7. A temperature sensor element,
wherein two electrodes are present on the same plane, and the two electrodes are bridged by the resin composition as being or constituting a temperature sensor according to claim 1.

8. The temperature sensor element according to claim 7, further comprising an auxiliary electrode on a surface of said resin composition as being or constituting a temperature sensor, on the opposite side of said electrodes.

9. The temperature sensor element according to claim 7, further comprising, between said two electrodes, in addition to said resin composition as being or constituting a temperature sensor, a second resin composition as being or constituting a temperature sensor with a different compounding ratio of said first acrylic monomer and said second acrylic monomer from that of said resin composition as being or constituting a temperature sensor.

10. A temperature sensor comprising:
the temperature sensor element of claim 7; and
a transistor connected to either one electrode of said temperature sensor element.

* * * * *